(12) United States Patent
Veilleux, Jr.

(10) Patent No.: US 9,657,643 B2
(45) Date of Patent: May 23, 2017

(54) ENERGY EFFICIENT PUMP SYSTEM

(71) Applicant: Hamilton Sundstrand Corporation, Windsor Locks, CT (US)

(72) Inventor: Leo J. Veilleux, Jr., Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 486 days.

(21) Appl. No.: 14/183,966

(22) Filed: Feb. 19, 2014

(65) Prior Publication Data
US 2015/0101339 A1   Apr. 16, 2015

Related U.S. Application Data

(60) Provisional application No. 61/891,695, filed on Oct. 16, 2013.

(51) Int. Cl.
| | | |
|---|---|---|
| *F02C 7/236* | (2006.01) | |
| *F02C 9/26* | (2006.01) | |
| *F02C 9/30* | (2006.01) | |
| *F02C 7/228* | (2006.01) | |
| *F23R 3/34* | (2006.01) | |
| *F23R 3/28* | (2006.01) | |

(52) U.S. Cl.
CPC .................................. *F02C 7/236* (2013.01)

(58) Field of Classification Search
CPC .. F02C 7/22; F02C 7/222; F02C 7/228; F02C 9/26; F02C 9/30; F02C 9/56
See application file for complete search history.

(56) References Cited

U.S. PATENT DOCUMENTS

| | | | | |
|---|---|---|---|---|
| 2,830,436 A | * | 4/1958 | Coar ......................... | F02K 1/17 60/241 |
| 8,418,964 B2 | * | 4/2013 | LeBlanc ................. | F02C 7/236 244/135 C |
| 2010/0064657 A1 | * | 3/2010 | Mahoney .................. | F02C 9/30 60/39.281 |
| 2010/0126136 A1 | | 5/2010 | Anson | |
| 2011/0243772 A1 | | 10/2011 | Leblanc et al. | |
| 2014/0150440 A1 | | 6/2014 | Suciu et al. | |

FOREIGN PATENT DOCUMENTS

| | | | |
|---|---|---|---|
| EP | 0145636 A1 | 6/1985 | |
| EP | 2088302 A2 | 8/2009 | |
| GB | 2289722 A * | 11/1995 | ............. F02C 7/228 |
| GB | 2455901 A | 7/2009 | |

OTHER PUBLICATIONS

British Search Report dated Apr. 16, 2015, for corresponding Great Britain Application No. 1418224.0.

\* cited by examiner

*Primary Examiner* — Jason L Vaughan
*Assistant Examiner* — Amanda Meneghini
(74) *Attorney, Agent, or Firm* — Kinney & Lange, P.A.

(57) ABSTRACT

A fuel system for a gas turbine engine, which includes a combustor section and an actuator, includes a fuel source, a combustor system, and an actuation system. The combustor system includes a combustor pump that is fluidly connected to the fuel source and to the combustor section, with the combustor pump being mechanically connected to and powered by an electric motor. The actuation system includes an actuator pump that is fluidly connected to the fuel source and to the actuator, with the actuator pump being mechanically connected to and powered by a gearbox or an electric motor.

10 Claims, 4 Drawing Sheets

ENERGY EFFICIENT PUMP SYSTEM

BACKGROUND

The present invention relates generally to gas turbine engines, and more particularly, to a fuel system of a gas turbine engine.

Gas turbine engines are often used to power aircraft, in which case most of the power is in the form of thrust. Some of the power generated by a gas turbine engine is in other forms, though, such as hydraulic pressure. This pressure can be created by pumps that are powered by the engine in various ways (e.g. mechanically by a take-off shaft). The pumps can pressurize various fluids to various pressures, including fuel for use in the combustion process as well as for use in actuation systems (an application that is commonly known as "fueldraulics"). Unfortunately, these pumping systems divert energy from the gas turbine engine that could instead be used to propel the aircraft, which decreases efficiency.

There is also the issue of failure of the hydraulic system. Because many of the hydraulic systems are crucial to the operation of the gas turbine engine, complete failure of one or more of them should be avoided. Therefore, it can be beneficial to have redundancy built into the hydraulic architecture, but this can add extra weight to the engine, further decreasing efficiency.

SUMMARY

According to one embodiment of the present invention, a fuel system for a gas turbine engine, which includes a combustor section and an actuator, includes a fuel source, a combustor system, and an actuation system. The combustor system includes a combustor pump that is fluidly connected to the fuel source and to the combustor section, with the combustor pump being mechanically connected to and powered by an electric motor. The actuation system includes an actuator pump that is fluidly connected to the fuel source and to the actuator, with the actuator pump being mechanically connected to and powered by a gearbox or an electric motor.

In another embodiment, a method of operating a fuel system, for a gas turbine engine that includes a combustor section and an actuator, includes powering a combustor pump with an electric motor and flowing fuel from a fuel source to the combustor section using the combustor pump. The method also includes powering an actuator pump with a gearbox and flowing fuel from the fuel source to the actuator using the actuator pump.

DETAILED DESCRIPTION

Figure 1:
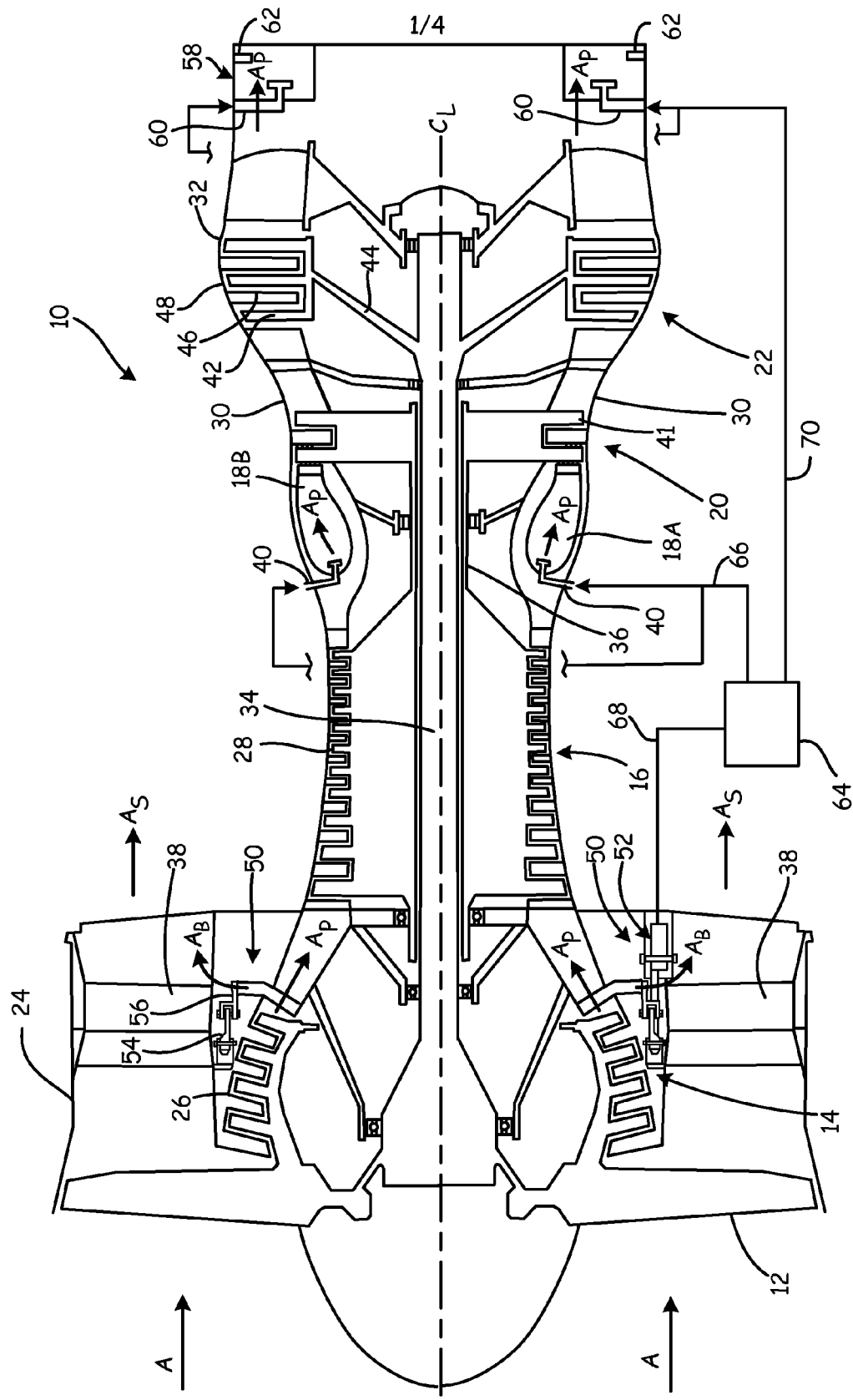
FIG. 1 is a schematic side cross-section view of a gas turbine engine.

FIG. 1 shows a cross section of gas turbine engine 10. Although FIG. 1 depicts a gas turbine engine typically used for aircraft propulsion, the invention is readily applicable to gas turbine generators and other similar systems incorporating rotor-supported, shaft-driven turbines. Shown in FIG. 1 are gas turbine engine 10 including fan 12, low pressure compressor (LPC) 14, high pressure compressor (HPC) 16, combustor section 18, high pressure turbine (HPT) 20, low pressure turbine (LPT) 22, fan case 24, LPC case 26, HPC case 28, HPT case 30, LPT case 32, low pressure shaft 34, high pressure shaft 36, exit guide vanes 38, injectors 40, HPT blades 41, LPT blades 42, support rotor 44, vane airfoil sections 46, case section 48, bleed valve 50, actuator 52, idler 54, ring 56, afterburner 58, sprayers 60, flame holders 62, fuel system 64, fuel line 66, fuel line 68, fuel line 70, inlet air A, primary air $A_P$, secondary air $A_S$ (also known as bypass air), bleed air $A_B$, and longitudinal engine centerline axis $C_L$.

In the illustrated embodiment, gas turbine engine 10 comprises a dual-spool turbofan engine in which the advantages of the present invention are particularly well illustrated. Gas turbine engine 10, of which the operational principles are well known in the art, includes fan 12, low pressure compressor (LPC) 14, high pressure compressor (HPC) 16, combustor section 18, high pressure turbine (HPT) 20, and low pressure turbine (LPT) 22, which are each concentrically disposed around longitudinal engine centerline axis $C_L$. Fan 12 is enclosed at its outer diameter within fan case 24. Likewise, the other engine components are correspondingly enclosed at their outer diameters within various engine casings, including LPC case 26, HPC case 28, HPT case 30 and LPT case 32. Fan 12 and LPC 14 are connected to LPT 22 through low pressure shaft 34, and together with fan 12, LPC 14, LPT 22, and low pressure shaft 34 comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 where it is divided into streams of primary air $A_P$ and secondary air $A_S$ after passing through fan 12. Fan 12 is rotated by low pressure turbine 22 through low pressure shaft 34 (either directly as shown or through a gearbox, not shown) to accelerate secondary air $A_S$ (also known as bypass air) through exit guide vanes 38, thereby producing a major portion of the thrust output of engine 10. Primary air $A_P$ (also known as gas path air) is directed first into low pressure compressor 14 and then into high pressure compressor 16. LPC 14 and HPC 16 work together to incrementally step up the pressure of primary air $A_P$. HPC 16 is rotated by HPT 20 through low pressure shaft 34 to provide compressed air to combustor section 18. The compressed air is delivered to combustors 18A-18B, along with fuel through injectors 40, such that a combustion process can be carried out to produce the high energy gases necessary to turn high pressure turbine 20 and low pressure turbine 22. Primary air $A_P$ continues through gas turbine engine 10 whereby it is typically passed through an exhaust nozzle to further produce thrust.

After being compressed in LPC 14 and HPC 16 and participating in a combustion process in combustors 18A-18B (FIG. 1) to increase pressure and energy, primary air $A_P$ flows through HPT 20 and LPT 22 such that blades 41, 42 extract energy from the flow of primary air $A_P$. Primary air $A_P$ impinges on HPT blades 41 to cause rotation of high pressure shaft 36, which turns HPC 16. Primary air $A_P$ also impinges on LPT blades 42 to cause rotation of support rotor 44 and low pressure shaft 34, which turns fan 12 and LPC 14.

Bleed valve 50 is attached to LPC case 26 and annularly surrounds LPC 14. It is advantageous to open bleed valve 50 at particular times, and this occurs by actuator 52 forcing ring 56 forward with assistance from a plurality of idlers 54

(although only one is shown in FIG. 1). In the illustrated embodiment, actuator 52 is powered by pressurized fuel. When bleed valve 50 is open, some of primary air $A_P$ flows through bleed valve 50 which is shown as bleed air $A_B$. This bleed air $A_B$ joins secondary air $A_S$ and is expelled from gas turbine engine 10.

Downstream of LPT 22 and connected to LPT case 32 is afterburner 58. Afterburner 58 includes sprayers 60 and flame holders 62. Under certain flight conditions, such as short runway take-offs, extra thrust is required from engine 10. Afterburner 58 sprays fuel from sprayers 60 which is ignited by flame holders 62 to provide this additional thrust.

Fuel system 64 provides fuel to combustor section 18, bleed valve 50, and afterburner 58. Fuel system 64 is connected to these systems by fuel lines 66, 68, and 70, respectively. The components and configuration of gas turbine engine 10 as shown in FIG. 1 allow for fuel to be distributed throughout engine 10. Accordingly, engine 10 can produce thrust through rotation of fan 12, LPC 14, HPC 16, HPT 20, and LPT 22 as well as through combustion in afterburner 58. In addition, various portions of engine 10 can be moved and manipulated by actuators. Although only bleed valve 50 is shown to be hydraulically powered by fuel, other systems can be present in engine 10 that operate using pressurized fuel.

FIG. 1 is a depiction of one embodiment of the present invention, to which there are alternative embodiments. For example, engine 10 can be a three spool engine. In such an embodiment, engine 10 has an intermediate compressor between LPC 14 and HPC 16 and an intermediate turbine between HPT 20 and LPT 22, wherein the intermediate compressor is connected to the intermediate turbine with an additional shaft.

Figure 2:
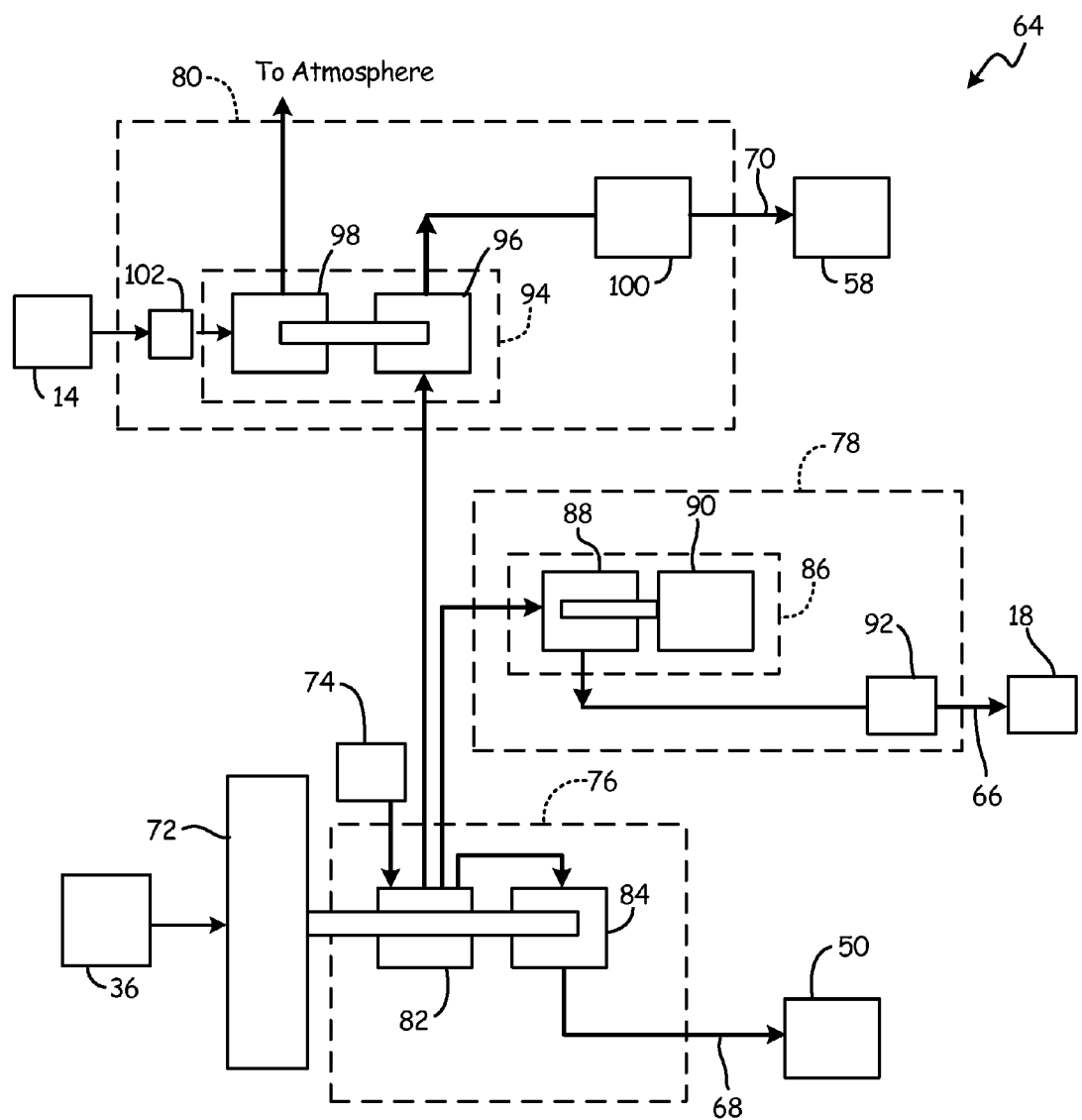
FIG. 2 is a diagram of a fuel system.

FIG. 2 is a diagram of an embodiment of fuel system 64. In the illustrated embodiment, fuel system 64 includes gear box 72, fuel tank 74, actuation system 76, combustor system 78, and afterburner system 80 as well as their respective destinations: combustor section 18, an actuator (such as valve 50), and afterburner 58. Also, gearbox 72 is connected to and driven by high pressure shaft 36 (shown in FIG. 1).

Actuation system 76 includes boost pump 82 and actuation pump 84. Each of boost pump 82 and actuation pump 84 are mechanically connected to and powered by a force source, such as a gearbox or an electric motor. In the illustrated embodiment, both boost pump 82 and actuation pump 84 are powered by a single gearbox 72. Boost pump 82 and actuation pump 84 each can be one of, for example, a vane pump, a centrifugal pump, a positive displacement pump, and a variable displacement pump. In the illustrated embodiment, boost pump 82 is a centrifugal pump that is fluidly connected to fuel tank 74 and to actuation pump 84. Actuation pump 84 is a variable displacement pump that is connected to bleed valve 50 via fuel line 68.

Combustor system 78 includes combustor pump assembly 86 and flow meter 92. Combustor pump assembly 86 includes combustor pump 88 which is mechanically connected to and powered by a force source, such as electric motor 90. Combustor pump 88 can be one of, for example, a vane pump, a centrifugal pump, a positive displacement pump, and a variable displacement pump. In the illustrated embodiment, combustor pump 88 is a vane pump that is fluidly connected to boost pump 82 and to flow meter 92. Flow meter 92 is fluidly connected to combustor section 18 via fuel line 66 and controls the flow of fuel between combustor pump 88 and combustor section 18.

Afterburner system 80 includes afterburner pump assembly 94, afterburner valve 100, and air valve 102. Afterburner pump assembly 94 includes afterburner pump 96 which is mechanically connected to and powered by a force source, such as a turbine or an electric motor. Afterburner pump 96 can be one of, for example, a vane pump, a centrifugal pump, a positive displacement pump, and a variable displacement pump. In the illustrated embodiment the force source is turbomachine 98, and afterburner pump 96 is a centrifugal pump that is fluidly connected to boost pump 82 and afterburner valve 100. Afterburner valve 100 is fluidly connected to afterburner 58 via fuel line 70 and controls the flow of fuel between afterburner pump 96 and afterburner 58. In addition, turbomachine 98 is fluidly connected to air valve 102, which is fluidly connected to LPC 14 (shown in FIG. 1). Turbomachine 98 uses compressed air to generate rotary motion, which is vented to the atmosphere, although turbomachine 98 can be an electric motor in an alternate embodiment.

Fuel tank 74 is connected to boost pump 82. During operation of engine 10 (shown in FIG. 1), fuel is drawn from fuel tank 74 by boost pump 82. In the illustrated embodiment, gearbox 72 empowers boost pump 82 to pressurize the fuel enough to reach and feed pumps 84, 88, and 96, which requires approximately 690 kPa to 1.0 MPa (100 psi to 150 psi) of pressure. In actuation system 76, gearbox 72 allows actuation pump 84 to further pressurize the fuel to a motive working level, for example, to 34 MPa (5000 psi) of pressure. Then the fuel can flow to the actuators in engine 10 (shown in FIG. 1), such as bleed valve 50.

In the illustrated embodiment, electric motor 90 of combustor system 78 empowers combustor pump 88 to pressurize the fuel to, for example, approximately 12 MPa (1800 psi) of pressure. Then the fuel flows through flow meter 92 which controls the flow to combustor section 18 depending on the operating requirements of engine 10 (shown in FIG. 1).

In the illustrated embodiment, air valve 102 is opened to activate afterburner system 80 when engine 10 (shown in FIG. 1) requires extra thrust. During operation, the air flow spins turbomachine 98 at high speed (for example, 100,000 rpm), which empowers afterburner pump 96 to pressurize the fuel to, for example, 10 MPa (1500 psi) of pressure. Then the fuel flows through afterburner valve 100 which controls the flow to afterburner 58.

The components and configuration of fuel system 64 as shown in FIG. 2 allow for fuel to be pressurized and flow through fuel system 64. More specifically, pumps 84, 88, and 96 are powered independently which allows pumps 84, 88, and 96 to operate at different speeds. This means that fuel can flow through systems 76, 78, and 80 at different pressures and rates, respectively. Moreover, pumps 88 and 96 are independent of gearbox 72 (and of LPC 14, shown in FIG. 1) so the speed of pumps 88 and 96 can be varied by controlling electric motor 90 and turbomachine 98, respectively, to optimize operation of pumps 88 and 96.

In other alternative embodiments, for example, afterburner 58 and afterburner system 78 can be absent if not required by the aircraft. In another example, fuel system 64 can have redundancy features, including those shown later in FIGS. 3-4. For a further example, boost pump 82 can be absent if fuel can be delivered to pumps 84, 88, and 96 by fuel tank 74 at sufficient pressure. For yet another example, boost pump 82 can be located in the airframe of the aircraft, outside of actuation system 76. For yet another example, air valve 102 can be fluidly connected to another source of compressed gas, such as HPC 16 (shown in FIG. 1).

Figure 3:
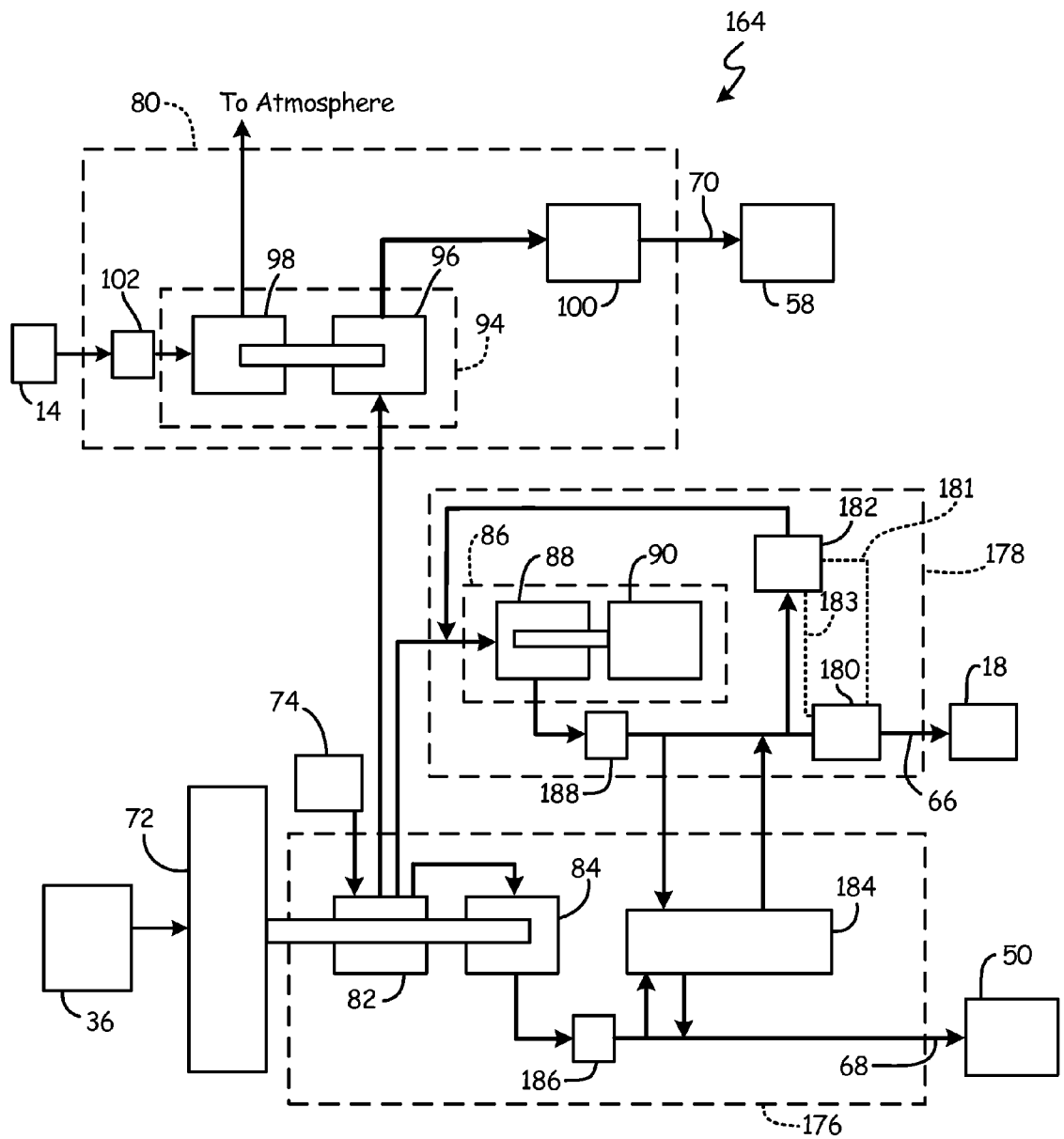
FIG. 3 is a diagram of an alternate embodiment fuel system.

In FIG. 3, a diagram of alternate embodiment fuel system 164 is shown. Fuel system 164 has some of the same components and architecture as fuel system 64 (shown in FIG. 2), although there are some notable differences. For example, combustor system 178 has throttle valve 180 and regulator valve 182 that are both fluidly connected to combustor pump 88. In addition, throttle valve 180 and regulator valve 182 are electrically connected to each other via sensor lines 181 and 183. In the illustrated embodiment, throttle valve 180 is a variable area valve that is fluidly connected to combustor section 18 via fuel line 66. Regulator valve 182 is fluidly connected to the inlet to combustor pump 88. During operation, throttle valve 180 is controlled to output more fuel than is required for use in combustor section 18. This excess flow is blocked by throttle valve 180 and regulator valve 182 is controlled through sensor line 181 to release this flow to be recirculated into combustor pump 88. In addition, sensor line 183 transmits the true pressure differential across throttle valve 180 to regulator valve 182. This architecture controls the flow to combustor section 18 depending on the operating requirements of engine 10 (shown in FIG. 1).

Fuel system 164 also may include fail selector 184, check valve 186, and check valve 188. In the illustrated embodiment, fail selector 184 is a three-way valve that is connected to the outputs of pumps 84 and 88, downstream of check valves 186 and 188, respectively. When fail selector 184 is in the neutral setting, there is no fuel flow through fail selector 184. In another setting, fuel selector 184 fluidly connects actuation pump 84 with combustor system 178, specifically with valves 180 and 182. This setting would be selected in case of a failure of combustor pump assembly 86, so that fuel would still be provided to combustor section 18. In this setting, check valve 188 prevents back flow through combustor pump assembly 86. In yet another setting, fuel selector 184 fluidly connects combustor pump 88 with actuation system 176, specifically with fuel line 68. This setting would be selected in case of a failure of actuation pump 84, so that fuel would still be provided to an actuator such as valve 50. In this setting, check valve 186 prevents back flow through actuation pump 84.

It is possible to size actuator pump 84 and combustor pump assembly 86 to provide full flow and pressure for both actuation system 176 and combustor system 178 in case of failure of pumps 84 or pump 88. However, this may not be the most efficient architecture because usually both pumps 84 and 88 will be operational. There can be sufficient redundancy by providing standard-size pumps 84 and 88 with the ability of each to be connected to both systems 176 and 178, which can provide enough flow and pressure to partially operate both systems 176 and 178 in event of failure of one of pumps 84 and 88.

FIG. 3 depicts one embodiment of the present invention, to which there are alternative embodiments. For example, fail selector 184 can be a two-way valve that connects and disconnects actuation system 176 and combustor system 178.

Figure 4:
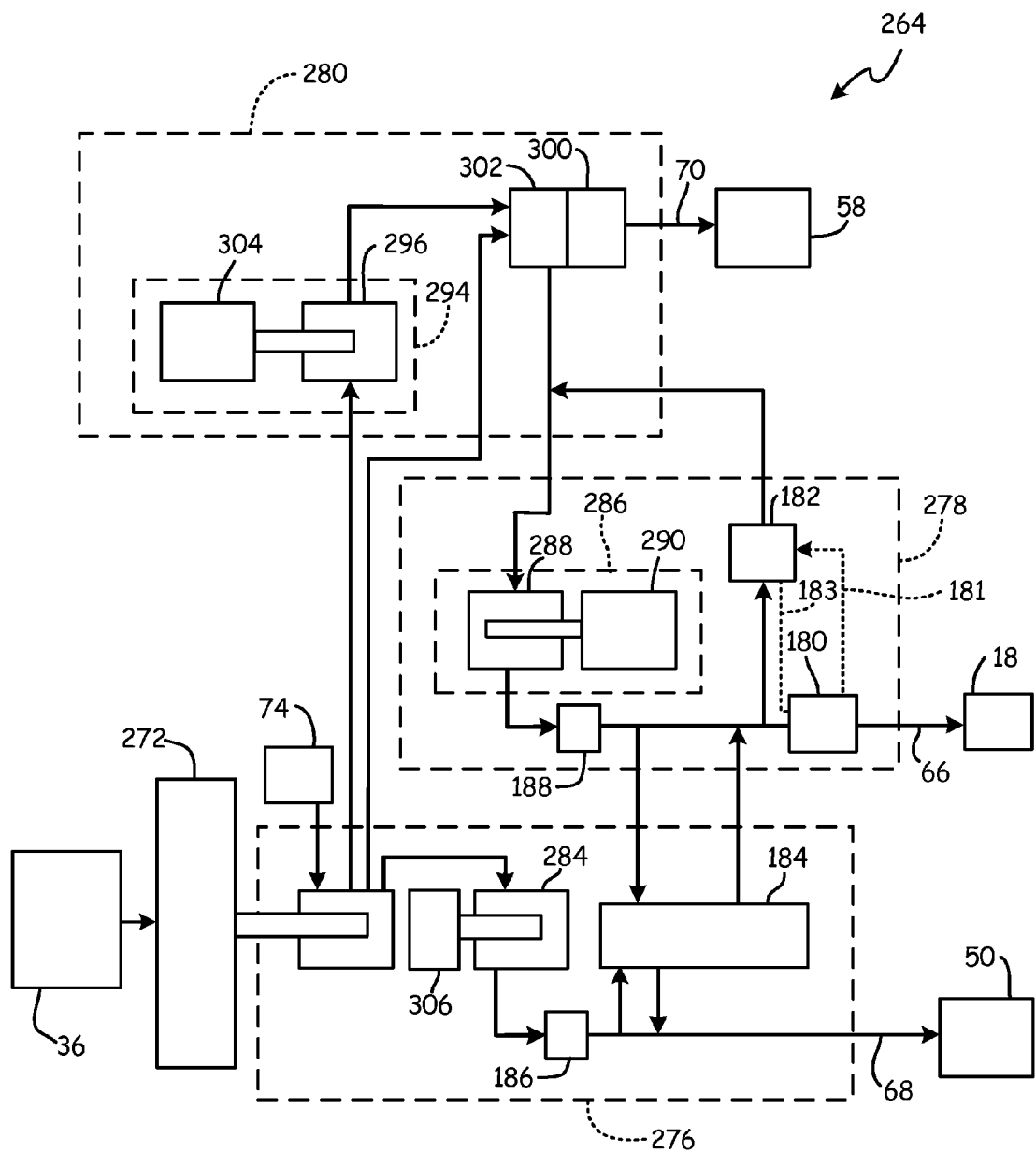
FIG. 4 is a diagram of an alternate embodiment fuel system.

FIG. 4 is a diagram of alternate embodiment fuel system 264. Fuel system 264 has some of the same components and architecture as fuel system 164 (shown in FIG. 3), although there are some notable differences. For example, afterburner pump assembly 294 includes afterburner pump 296 which is mechanically connected to and powered by electric motor 304. For another example, boost pump 82 is fluidly connected to afterburner system 280 at pump selector 302. Pump selector 302 is a valve that is also fluidly connected to afterburner pump 296, afterburner valve 300, and combustor pump 288. When pump selector 302 is in the neutral setting, pump selector 302 fluidly connects boost pump 82 to combustor pump 288 and afterburner pump 296 to afterburner 58. In another setting, pump selector 302 fluidly connects afterburner pump 296 of afterburner system 280 with combustor system 278. This setting would be selected in case of a failure of actuation pump 84.

If such a failure occurred, afterburner system 280 would be initiated by providing electrical power to electric motor 304. Afterburner valve 300 and pump selector 302 would then flow fuel from afterburner pump 296 to combustor pump 288. In this situation, the pressure of fuel coming in to combustor pump 288 is supercharged and is much higher than the normal pressure from boost pump 82. Electric motor 190 also drives combustor pump 288 at a much faster rate, which increases the pressure and fuel flow rate from combustor pump 288. More specifically, the pressure of afterburner pump 296 is effectively added to combustor pump 288. In the illustrated embodiment, the output of combustor pump 288 would be at, for example, approximately 23 MPa (3300 psi) of pressure. Then, fail selector 184 can be set to flow fuel from combustor pump 288 to actuation system 176, specifically to fuel line 68. Fuel would thereby be provided to the actuator, such as valve 50, at a pressure that is higher than that provided by redundancy of fuel system 164 (shown in FIG. 3).

Also shown in FIG. 4 is alternate embodiment actuation system 276. In actuation system 276, only boost pump 282 is mechanically connected to and powered by gearbox 272. Actuation pump 284 is mechanically connected to and powered by electric motor 306.

It should be recognized that the present invention provides numerous benefits and advantages. For example, the fuel system can operate with excellent efficiency because each pump can be controlled independently to run at peak efficiency at all times. Redundancy can also be built into the fuel system to provide operability in case of pump failure.

DISCUSSION OF POSSIBLE EMBODIMENTS

The following are non-exclusive descriptions of possible embodiments of the present invention.

A fuel system for a gas turbine engine that includes a combustor section and an actuator, the fuel system according to an exemplary embodiment of this disclosure, among other possible things includes: a fuel source; a combustor system including a combustor pump that is fluidly connected to the fuel source and to the combustor section, the combustor pump being mechanically connected to and powered by a first electric motor; and an actuation system including an actuation pump that is fluidly connected to the fuel source and to the actuator, the actuation pump being mechanically connected to and powered by a first force source.

The fuel system of the preceding paragraph can optionally include, additionally and/or alternatively, any one or more of the following features, configurations and/or additional components:

A further embodiment of the foregoing fuel system, wherein the first force source can be a gearbox.

A further embodiment of any of the foregoing fuel systems, wherein the first force source can be a second electric motor.

A further embodiment of any of the foregoing fuel systems, wherein the fuel system can further comprise: an afterburner system including an afterburner pump that is fluidly connected to the fuel source and to an afterburner, the afterburner pump being mechanically connected to and powered by a second force source.

A further embodiment of any of the foregoing fuel systems, wherein the second force source can be a turbomachine.

A further embodiment of any of the foregoing fuel systems, wherein the second force source can be a third electric motor.

A further embodiment of any of the foregoing fuel systems, wherein the fuel system can further comprise: a fail selector that is fluidly connected to the combustor pump, the actuator pump, the combustor section, and the actuator, the fail selector having three settings comprising: a first setting that allows no flow through the fail selector; a second setting that allows flow from the combustor pump to both the combustor section and the actuator through the fail selector; and a third setting that allows flow from the actuator pump to both the combustor section and the actuator through the fail selector.

A further embodiment of any of the foregoing fuel systems, wherein the fuel system can further comprise: an afterburner system including an actuator pump that is fluidly connected to the fuel source and to an afterburner, the afterburner pump being mechanically connected to and powered by a turbomachine or a third electric motor; and a pump selector that is fluidly connected to the afterburner system and is fluidly connected between the fuel source and the combustor system, the pump selector having two settings comprising: a first setting that allows flow from the fuel source to the combustor section; and a second setting that allows flow from the afterburner system to the combustor system.

A further embodiment of any of the foregoing fuel systems, wherein the fuel system can further comprise: a boost pump fluidly connected between the fuel source and the combustor and actuator pumps.

A further embodiment of any of the foregoing fuel systems, wherein a gas turbine engine including the fuel system can further comprise: a compressor upstream of the combustor; a turbine downstream of the combustor; and a shaft that couples the turbine to the compressor.

A further embodiment of the foregoing gas turbine engine, wherein the first force source can be a gearbox that is connected to the shaft.

A further embodiment of any of the foregoing gas turbine engines, wherein the gas turbine engine can further comprise: a boost pump fluidly connected between the fuel source and the combustor and actuator pumps; wherein the boost pump is mechanically connected to and powered by the first force source.

A method of operating a fuel system for a gas turbine engine that includes a combustor section and an actuator, the method according to an exemplary embodiment of this disclosure, among other possible things includes: powering a combustor pump with an electric motor; flowing fuel from a fuel source to the combustor section using the combustor pump; powering an actuator pump with a gearbox or an electric motor; and flowing fuel from the fuel source to the actuator using the actuator pump.

A further embodiment of any of the foregoing gas turbine engines, wherein the gas turbine engine can further include an afterburner, and the method can further comprise: powering an afterburner pump with a turbomachine; and flowing fuel from the fuel source to the afterburner using the afterburner pump.

A further embodiment of any of the foregoing methods, wherein the method can further comprise: flowing fuel from the fuel source to the combustor pump using the afterburner pump; and flowing fuel from the fuel source to both the combustor section and the actuator using the combustor pump after a failure of the actuator pump.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel system for a gas turbine engine that includes a combustor section and an actuator, the fuel system comprising:
   a fuel source;
   a combustor system including a combustor pump that is fluidly connected to the fuel source and to the combustor section, the combustor pump being mechanically connected to and powered by a first electric motor;
   an actuation system including an actuation pump that is fluidly connected to the fuel source and to the actuator, the actuation pump being mechanically connected to and powered by a first force source;
   a fail selector that is fluidly connected to the combustor pump, the actuator pump, the combustor section, and the actuator, the fail selector having three settings comprising:
      a first setting that allows no flow through the fail selector;
      a second setting that allows flow from the combustor pump to both the combustor section and the actuator through the fail selector; and
      a third setting that allows flow from the actuator pump to both the combustor section and the actuator through the fail selector;
   an afterburner system including an afterburner pump that is fluidly connected to the fuel source and to an afterburner, the afterburner pump being mechanically connected to and powered by a turbomachine or a third electric motor; and
   a pump selector that is fluidly connected to the afterburner system and is fluidly connected between the fuel source and the combustor system, the pump selector having two settings comprising:
      a first setting that allows flow from the fuel source to the combustor section; and
      a second setting that allows flow from the afterburner system to the combustor system.

2. The fuel system of claim 1, wherein the first force source is a gearbox.

3. The fuel system of claim 1, wherein the first force source is a second electric motor.

4. The fuel system of claim 1, wherein the second force source is a turbomachine.

5. The fuel system of claim 1, wherein the second force source is a third electric motor.

6. The gas turbine engine of claim 5, and further comprising:
   a boost pump fluidly connected between the fuel source and the combustor and actuator pumps;
   wherein the boost pump is mechanically connected to and powered by the first force source.

7. The fuel system of claim 1, and further comprising:
a boost pump fluidly connected between the fuel source and the combustor and actuator pumps.

8. A gas turbine engine including the fuel system of claim 1, the gas turbine engine further comprising:
a compressor upstream of the combustor section;
a turbine downstream of the combustor section; and
a shaft that couples the turbine to the compressor.

9. The gas turbine engine of claim 8, wherein the first force source is a gearbox that is connected to the shaft.

10. A method of operating a fuel system for a gas turbine engine that includes a combustor section, an afterburner, and an actuator, the method comprising:
powering a combustor pump with an electric motor;
flowing fuel from a fuel source to the combustor section using the combustor pump;
powering an actuator pump with a gearbox or an electric motor;
flowing fuel from the fuel source to the actuator using the actuator pump;
powering an afterburner pump with a turbomachine;
flowing fuel from the fuel source to the afterburner using the afterburner pump;
flowing fuel from the fuel source to the combustor pump using the afterburner pump; and
flowing fuel from the fuel source to both the combustor section and the actuator using the combustor pump after a failure of the actuator pump.

* * * * *